ns Patent

Bach et al.

[15] 3,697,558
[45] Oct. 10, 1972

[54] PREPARATION OF 17ALPHA-ETHYNYLESTRIOL

[72] Inventors: Nicholas J. Bach; Eugene Farkas, both of Indianapolis, Ind.

[73] Assignee: Eli Lilly and Company, Indianapolis, Ind.

[22] Filed: March 24, 1971

[21] Appl. No.: 127,771

[52] U.S. Cl.........260/397.5, 260/239.55 D, 260/999
[51] Int. Cl.............................................C07c 169/08
[58] Field of Search........Machine Searched Steroids Primary Examiner—Henry A. French
Attorney—James L. Rowe and Everet F. Smith

[57] ABSTRACT

An improved process for preparing 17α-ethynylestriol utilizing a novel isomer separation process 2 Claims, No Drawings

PREPARATION OF 17ALPHA-ETHYNYLESTRIOL

BACKGROUND OF THE INVENTION

17α-Ethynylestriol and its 17β-ethynyl-17α-hydroxy isomer are disclosed by Engelfried, et al., *Arzneim. Forsch.* 16, 1518–21 (1966). As disclosed in the copending application of Kraay and Farkas, Ser. No. 127,690, filed this even date, 17α-ethynylestriol is a weak estrogenic hormone but its 3-cyclopentyl ether is an extremely potent estrogen having a favorable uterotropic-vaginal ratio in its hormonal action. The 3-cyclopentyl ether derivative of 17α-ethynylestriol can be prepared either by reacting a metal salt of 17α-ethynylestriol (as prepared by Engelfried et al., supra.) with cyclopentyl bromide or by ethynylating the 3-cyclopentyl ether of 16α-acetoxyestrone. The latter procedure gives a preponderance of the undesired 17β-ethynyl-17α-hydroxy isomer. By contrast, ethynylation of 16α-acetoxyestrone itself yields a preponderance of the desired 17α-ethynyl-17α-hydroxy isomer, which upon etherification yields the more potent hormone isomer. The chief drawback of this latter procedure, however, is the lack of a satisfactory method of separating the two isomeric estriol products produced by the ethynylation reaction.

It is an object of this invention to provide a rapid, efficient procedure for separating 17α-ethynylestriol from its 17β-ethynyl-17α-hydroxy isomer.

SUMMARY

In fulfillment of the above and other objects, this invention provides a process for separating 17α-ethynylestriol from 17β-ethynylestra-1,3,5(10)-triene-3,16α,17α-triol (its 17β-ethynyl-17α-hydroxy isomer) which comprises the formation of an acetonide of the latter compound followed by separation of the acetonide from the unreacted 16α,17β-dihydroxy compound by chromatography, fractional crystallization or other suitable method. The above process is operative not only for compounds having a free phenolic group at the 3 position of the estriol molecule but also for those compounds having a lower alkyl or cycloalkyl ether group in the 3 position. Our novel process is illustrated by the following reaction scheme.

REACTION SCHEME 1

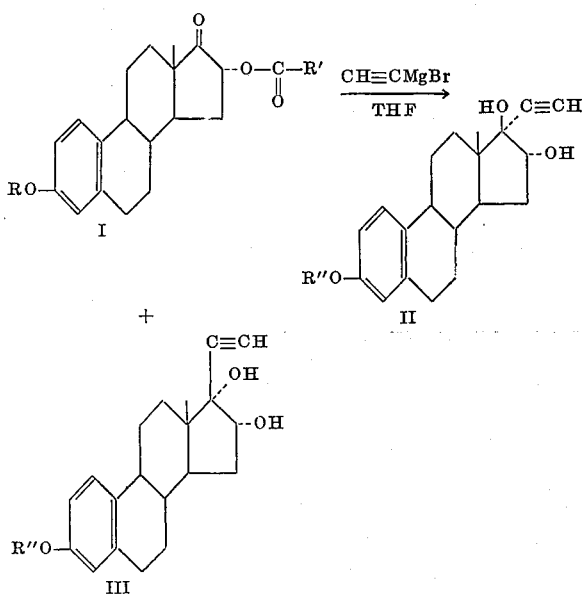

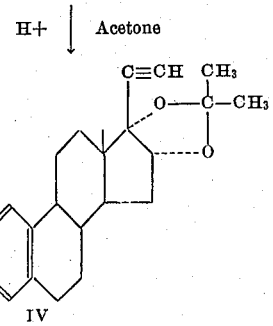

wherein R is H, $C_1$–$C_4$ alkanoyl, $C_1$–$C_3$ alkyl or $C_5$–$C_6$ cycloalkyl, R' is $C_1$–$C_3$ alkyl, and R'' is H, $C_1$–$C_3$ alkyl or $C_5$–$C_6$ cycloalkyl.

In the above formula, R can be n-butyryl, isobutyryl, propionyl, acetyl, formyl, methyl, ethyl, n-propyl, isopropyl, cyclopentyl, cyclohexyl, or the like group, and R' can be methyl, ethyl, n-propyl, or isopropyl.

17α-Ethynylestriol (Reaction Scheme 1; R''=H) can be converted into its 3-cyclopentyl ether by reaction with a cyclopentyl halide in the presence of sodium methoxide, thallium ethylate, or like base. As set forth in Ser. No. 127,690, filed this even date, 17α-ethynylestriol 3-cyclopentyl ether is particularly useful in treating menopausal syndrome. All of the compounds, however, coming within the scope of formula II above, and prepared in pure form by the process of this invention, have an estrogenic action with a favorable uterotropic-vaginal ratio.

This invention is further illustrated by the following specific example:

EXAMPLE

A 3 molar ethyl magnesium bromide Grignard Reagent in tetrahydrofuran, prepared according to standard procedures, was filtered through glass wool and added slowly to 700 ml. of tetrahydrofuran previously saturated with acetylene at about 0°C. During the addition of the ethyl magnesium bromide, the reaction mixture was cooled to about 0°C. and in addition, acetylene was slowly bubbled through the solution. The resulting reaction produced about 1.75 moles of ethynyl magnesium bromide in 1,300 ml. of tetrahydrofuran. Next, a solution containing 10 g. of 16α-hydroxyestrone diacetate [prepared by the method of Leeds, Fukushima, and Gallagher, *J. Am. Chem. Soc.* 76, 2943 (1954)] in 250 ml. of tetrahydrofuran was added to the ethynyl magnesium bromide solution in dropwise fashion. The reaction mixture was refluxed for 24 hours under a nitrogen atmosphere and was then cooled to about 0°C. About 750 ml. of a saturated ammonium chloride solution was added carefully, followed by an equal volume of water. The organic materials were extracted into ethyl acetate. The ethyl acetate layer was separated and washed successively with water and saturated aqueous sodium chloride. The solution was dried and the solvents were evaporated in vacuo. The resulting residue was triturated with about 1 l. of boiling hexane and the hexane extract discarded. The remaining insoluble material was dissolved in about 1,500 ml. of acetone to which was added 5 ml. of 70 percent aqueous perchloric acid. The solution was transferred to a flask which was stirred magnetically at ambient temperatures for about 12 hours. An excess of solid sodium bicarbonate was added and the resulting mixture filtered. The filtrate was concentrated to a volume of about 250 ml. and diluted with an equal volume of ethyl acetate. The ethyl acetate layer was washed successively with water and saturated aqueous sodium chloride and was dried. The volatile constituents were removed by evaporation in vacuo. The resulting residue was slurried with chloroform and chromatographed over about 500 g. of florisil. Elution with 3,000 ml. of chloroform, followed by evaporation of the chloroform in vacuo, yielded an orange oil. The oil was dissolved in an ether-hexane solvent mixture to yield crystals of 17β-ethynylestra-1,3,5(10)-triene-3,16α,17α-triol-16,17-acetonide, melting at about 208°–211° C. (The 17β-ethynyl-17α-hydroxy isomer is produced as a minor component in the reaction of 16α-hydroxyestrone diacetate and ethynyl magnesium bromide.) Further development of the chromatogram with 1,000 ml. of ether gave a fraction containing both 17α-ethynylestriol and the 17β isomer, as determined by thin layer chromatography. Finally, elution with 1 l. of methanol yielded, after evaporation of the solvent, a dark brown solid showing only a single spot in thin-layer chromatography. The solid was washed with chloroform and filtered to yield about 5 g. of 17α-ethynylestriol as a light tan powdery solid melting with decomposition at about 243°–245° C. Recrystallization of the solid from an ethyl acetate-hexane mixture yielded light tan crystals of 17α-ethynylestriol melting with decomposition at about 245° C.

11.3 g. of 17α-ethynylestriol thus produced were dissolved in 500 ml. of methanol. A 50 percent molar excess of freshly prepared sodium methoxide in methanol was added. The resulting solution was concentrated in vacuo to a solid comprising the sodium salt of 17α-ethynylestriol. The solid was dissolved with warming in 500 ml. of dimethylformamide. 50 ml. of cyclopentyl bromide were added and the mixture heated to reflux under a nitrogen atmosphere for about 4 hours. The reaction mixture was cooled and then diluted with 1 l. of ethyl acetate and 1 l. of water. The resulting organic layer was washed three times with water followed by saturated aqueous sodium chloride wash and was then dried. Evaporation of the solvent in vacuo yielded a solid residue which was slurried with chloroform and chromatographed over about 100 g. of florisil. Elution with chloroform yielded a brownish solid residue on evaporation of the solvent. Recrystallization of this residue from a mixture of ethyl ether and hexane yielded about 7.7 g. of 17α-ethynylestriol 3-cyclopentyl ether, melting at about 162°–165° C.

An alternative preparation for the last step of the procedure is as follows: 2.1 g. of 17α-ethynylestriol were dissolved in 100 ml. of absolute ethanol. A solution containing about 0.6 ml. of thallium ethylate in 10 ml. of benzene was added with stirring in dropwise fashion. Stirring was continued for another 10 minutes after which time the solvents were removed by evaporation in vacuo. The residue, comprising the thallium salt of 17α-ethynylestriol, was slurried with 100 ml. of dimethylformamide. 10 ml. of cyclopentyl bromide were added and the mixture heated at 90°–95° C. for 4 hours under a nitrogen atmosphere. 17α-Ethynylestriol 3-cyclopentyl ether thus produced was isolated and purified as in the above example.

In accordance with the above procedure, 16α-hydroxyestrone 3-methyl ether 16-acetate and 16α-hydroxyestrone 3-cyclopentyl ether 16-acetate can be reacted with ethynyl magnesium bromide to yield mixtures of 17β-ethynylestra-1,3,5(10)-triene-3,16α,17α-triol 3-methyl ether and 17α-ethynylestriol 3-methyl ether and 17β-ethynylestra-1,3,5(10)-triene-3,16α,17α-triol 3-cyclopentyl ether and 17α-ethynylestriol 3-cyclopentyl ether, respectively. In each instance the undesired 16α,17α derivative is converted to the acetonide according to the above procedure and the acetonide separated from the unreacted 16α,17β isomer, the desired isomers, by chromatography, thus yielding purified 17α-ethynylestratriol 3-methyl ether and 17α-ethynylestratriol 3-cyclopentyl ether.

Other compounds which can be prepared in substantially pure form free from their 17α-hydroxy isomers include:

17α-ethynylestriol 3-cyclohexyl ether,
17α-ethynylestriol 3-ethyl ether, and
17α-ethynylestriol 3-isopropyl ether.

We claim:

1. The process which comprises reacting a compound of the structure

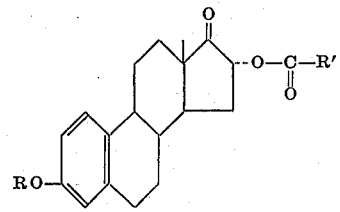

wherein R is H, $C_1$–$C_4$ alkanoyl, $C_1$–$C_3$ alkyl or $C_5$–$C_6$ cycloalkyl; and R' is $C_1$–$C_3$ alkyl; with ethynyl magnesium bromide to yield a mixture of isomers having the following structures:

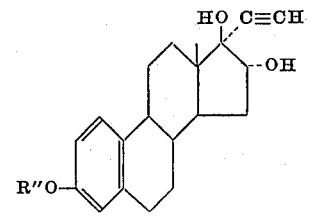

and

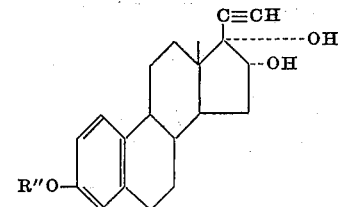

wherein R'' is H, $C_1$–$C_3$ alkyl or $C_5$–$C_6$ cycloalkyl; reacting the 16α,17α-dihydroxy isomer with acetone in the presence of acid to yield a compound of the formula

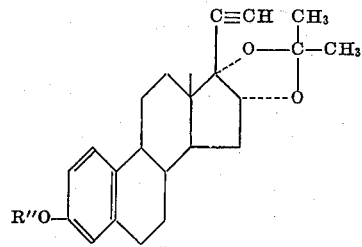

wherein R″ has the same meaning as hereinabove; separating said acetonide from the desired 16α,17β-dihydroxy isomer, and recovering said 16α,17β-dihydroxy isomer substantially free from any 16α,17α isomer.

2. The process of obtaining 17α-ethynylestratriol free from an impurity comprising its 17β-ethynyl-1,3,5(10)-estratriene-3,16α,17α-triol isomer, which comprises forming an acetonide of said 16α,17α-dihydroxy isomer and then separating said acetonide impurity from said 17α-ethynylestratriol by chromatography.

* * * * *